(12) United States Patent
Lee

(10) Patent No.: US 7,326,086 B1
(45) Date of Patent: Feb. 5, 2008

(54) CARD ADAPTER STRUCTURE

(76) Inventor: Yun-Hsiu Lee, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 11/701,475

(22) Filed: Feb. 2, 2007

(51) Int. Cl.
*H01R 24/00* (2006.01)
(52) U.S. Cl. ..................................... 439/630; 439/945
(58) Field of Classification Search ................ 439/181, 439/620.21, 620.22, 620.24, 630, 945
See application file for complete search history.

(56) References Cited

U.S. PATENT DOCUMENTS

| | | | | |
|---|---|---|---|---|
| 5,040,993 A | * | 8/1991 | Krug et al. | 439/75 |
| 7,052,295 B1 | * | 5/2006 | Lin | 439/159 |
| 7,097,512 B1 | * | 8/2006 | Hsiao et al. | 439/630 |
| 7,172,464 B1 | * | 2/2007 | Lee | 439/630 |
| 7,189,118 B2 | * | 3/2007 | Lee | 439/630 |
| 2006/0166559 A1 | * | 7/2006 | Nakai et al. | 439/630 |

* cited by examiner

*Primary Examiner*—Thanh-Tam T. Le
(74) *Attorney, Agent, or Firm*—Troxell Law Office, PLLC

(57) ABSTRACT

The present invention provides an improved card adapter structure that includes an upper cover, a lower cover, a converter terminal set and a positioning elastic strip set. The upper cover has a structure designed to conform to short memory card (MS) specifications, wherein an insertion slot is defined at the rear of the upper cover corresponding to the shape of a micro memory card (M2). The lower cover has a fixing portions and a positioning structure corresponding to those of the upper cover. Moreover, at least one terminal of the No. four, six, seven and eight terminals of the converter terminal set is configured with a gap that is joined to an electric resistance. The positioning elastic strip set is correspondingly located between both covers. Accordingly, the present invention is able to convert a micro memory card into a short memory card of relatively larger size.

10 Claims, 6 Drawing Sheets

CARD ADAPTER STRUCTURE

BACKGROUND OF THE INVENTION (a) Field of the Invention

The present invention relates to an improved card adapter structure, and more particularly to a structural assembly comprising an upper cover, a lower cover, a converter terminal set and an elastic strip set, moreover, at least one terminal of the No. four, No. six, No. seven and No. eight terminals of the converter terminal set is configured with a gap, and the gap is joined to an electric resistance. Accordingly, the present invention is able to convert a micro memory card of relatively small size into a short memory card of relatively larger size to facilitate insertion into digital products having a short memory card circuit interface for use thereof, and provides a configuration having effectiveness of a simple and convenient structural assembly, which enables fixedly positioning each of the terminals, restricts current flow, reinforces grounding, protects data stored within memory, isolates noise interference, improves memory card data access and increases frequency of use. Moreover, the present invention is applicable for use in various types of card adapter structures or similar structures.

(b) Description of the Prior Art

The current popularity of 3C (computer, communications and consumer electronics) digital products, such as digital cameras, PDAs (personal digital assistants), MP3 (media player) personal stereos, have driven the vigorous development of flash memory cards and the derivation of a variety of memory cards having different size, form and specifications. The current most common memory card specifications include SM (SmartMedia), xD-Picture Card, CF (CompactFlash), MD (MicroDrive), MS (Memory Stick) and SD (Secure Digital), MMC (MultiMedia Card). However, with the increasing miniaturization of 3C digital products, manufacturers have released mini memory cards having substantially smaller size specifications, including the MS and MS PRO extended Duo series, and the extended miniSD, RS-MMC and Transflash derived from the SD and MMC specifications. The Transflash card, however, is still the smallest memory card in the current market, and the MS and MS PRO camps are actively promoting a micro memory card (Memory Stick Micro, M2) similar to that of the Transflash card. Nevertheless, continuous miniaturization of memory cards occupies a small area of the core market, and size of each type of memory card having different structural form and specifications differs or configuration of circuit port contact points varies.

Referring to FIG. 1, which specifies a circuit port of a current micro memory card (M2) a provided with eleven contact pins al and a circuit port of a short memory card (MS) b configured with ten contact pins b1, one less than the micro memory card (M2), wherein No. one and No. 2 contact pins al of the micro memory card (M2) a are currently non-functioning but reserved for future use, and No. one and No. ten contact pins b1 of the short memory card (MS) b are configured with the same function. Moreover, No. four, six, seven and eight terminals (which are configured as DAT A3, DAT A2, DAT A0 and DAT A1 communication terminals respectively) of a converter terminal set are formed as an integral body and unable to effect functionality to restrict current flow, which can cause damage to the circuit and memory structure resulting from overcurrent when in use. Hence, the inventor of the present invention having accumulated years of experience in related arts, attentively and circumspectly carried out extensive study and exploration to ultimately design a new improved card adapter structure that facilitates converting the relatively small sized micro memory card (M2) into a relatively larger sized short memory card (MS), functions to restrict current flow, and facilitates inserting into a digital product provided with a short memory card (MS) circuit port for further use thereof.

SUMMARY OF THE INVENTION

A primary objective of the present invention is to provide an improved card adapter structure that uses a structural assembly comprising an upper cover, a lower cover, a converter terminal set and an elastic strip set, wherein at least one terminal of No. four, No. six, No. seven and No. eight terminal (which are configured as DAT A3, DAT A2, DAT A0 and DAT A1 communication terminals respectively) of the converter terminal set is configured with a gap, and the gap is joined to an electric resistance, functioning to restrict current flow, and effectively preventing overcurrent and minimizing damage to the circuit and memory structure, thereby providing a configuration having effectiveness of a simple and convenient structural assembly, which functions to restrict current flow and is convenient to use, substantially increasing practicability and convenience of the entire configuration.

Another objective of the present invention is to provide the improved card adapter structure with a configuration that uses an injection molded fixing mount to fixedly cover each of the terminals of the converter terminal set, thereby fixedly positioning each of the terminals of the converter terminal set. Moreover, ten contact pins extend outward from the terminals of the converter terminal set toward a short memory card (MS) port, wherein No. one and No. ten pins of the ten contact pins are configured with a large grounding area, thereby providing the card adapter structure with a substantially large and stable grounding area, and providing the present invention with a configuration having effectiveness to fixedly position each of the terminals, reinforce grounding, protect data stored within memory, isolate noise interference, improve memory card data access, increase frequency of use and facilitate design of the card adapter circuit and structure, which increase practicability, convenience and safety of the entire configuration. In order to achieve the aforementioned objectives, the improved card adapter structure of the present invention comprises an upper cover, a lower cover, a converter terminal set and a positioning elastic strip set. The upper cover has a structure designed to conform to short memory card (MS) specifications, wherein an insertion slot is defined at the rear of the upper cover corresponding to the shape of a micro memory card (M2). Fixing portions are located on two sides of the insertion slot, and a positioning structure is configured on a bottom surface of the upper cover. The lower cover has a structural disposition corresponding to that of the upper cover, including fixing portions and a positioning structure corresponding to those of the upper cover. A fixing mount fixedly covers each of the terminals of the converter terminal set, and ten and nine contact pins respectively extend from two sides of the converter terminal set. Moreover, at least one terminal of the No. four, six, seven and eight terminals of the converter terminal set is configured with a gap that is joined to an electric resistance. The positioning elastic strip set is correspondingly located between the fixing portions of the upper cover and the lower cover. Accordingly, the present invention is able to convert a micro memory card of relatively small size into a short memory card of relatively larger size to facilitate insertion into digital products having a short memory card circuit interface for use thereof, and provides a configuration having effectiveness of a simple and convenient structural assembly, which enables fixedly positioning each of the terminals, restricts current flow, reinforces grounding, protects data stored within memory, isolates noise interference, improves memory card data access and increases frequency of use, which increase practicability, convenience and safety of the entire configuration.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
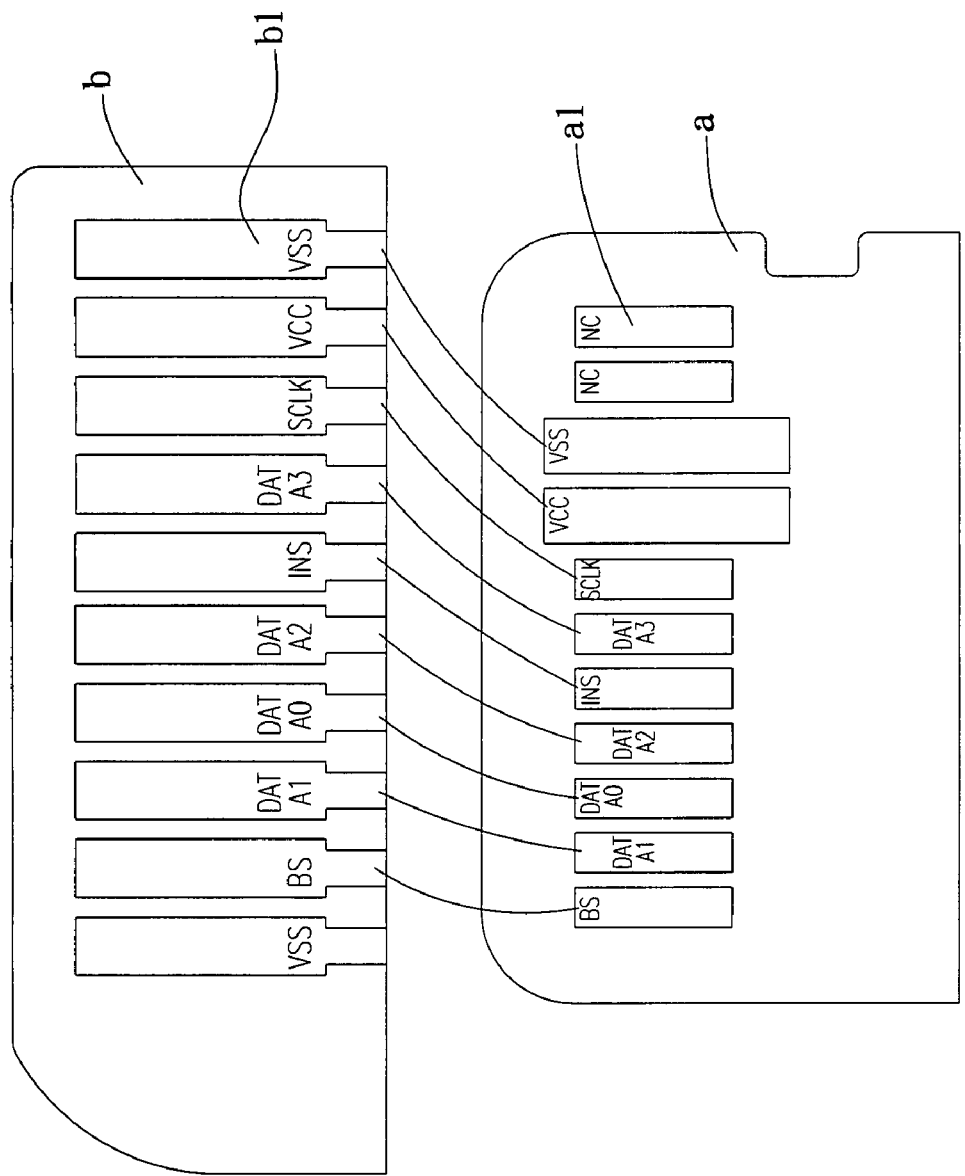
FIG. 1 shows a schematic view depicting electrical connections between a micro memory card (M2) and a short memory card (MS) of prior art.
Figure 2:
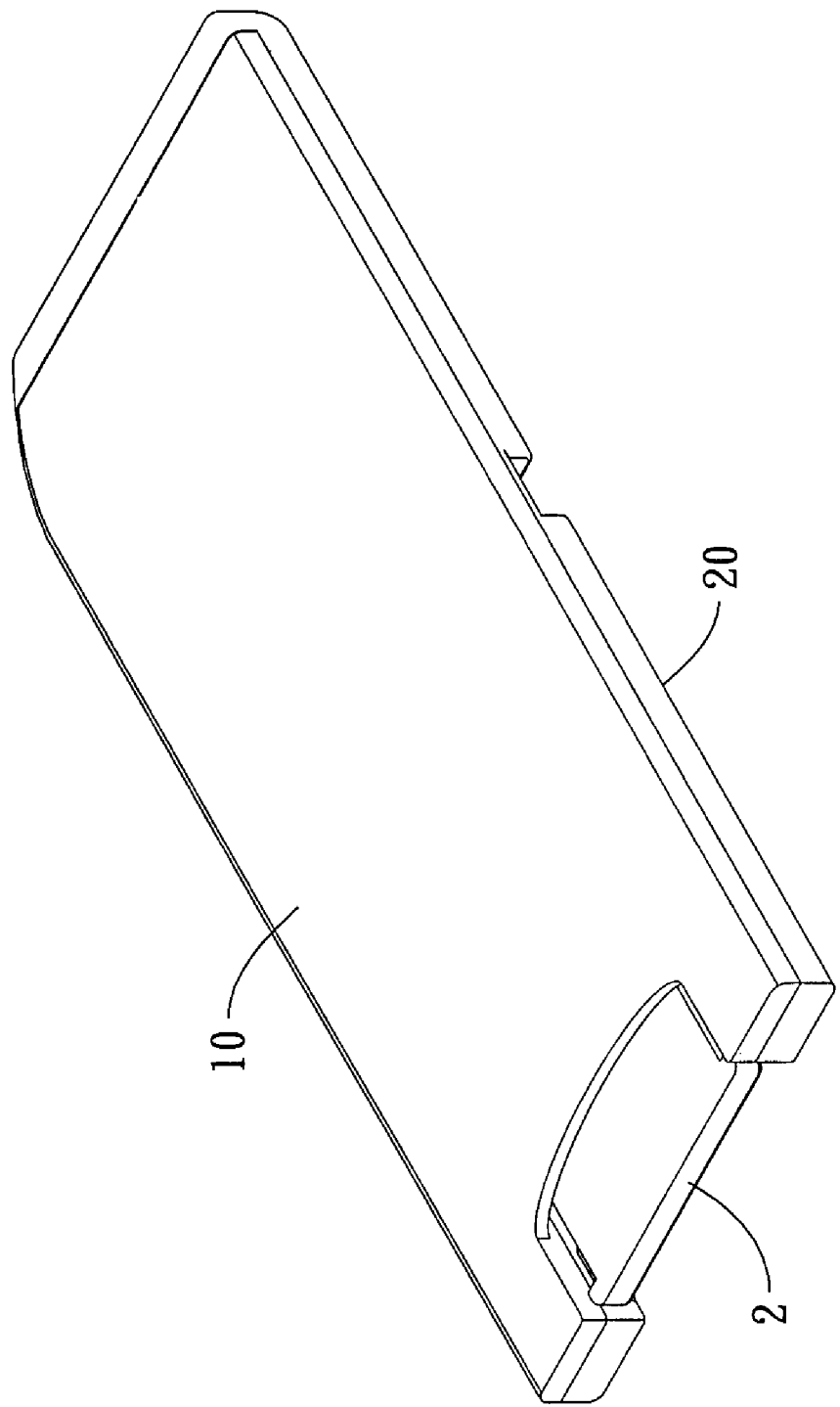
FIG. 2 shows an elevational view of an embodiment of the present invention.
Figure 3:
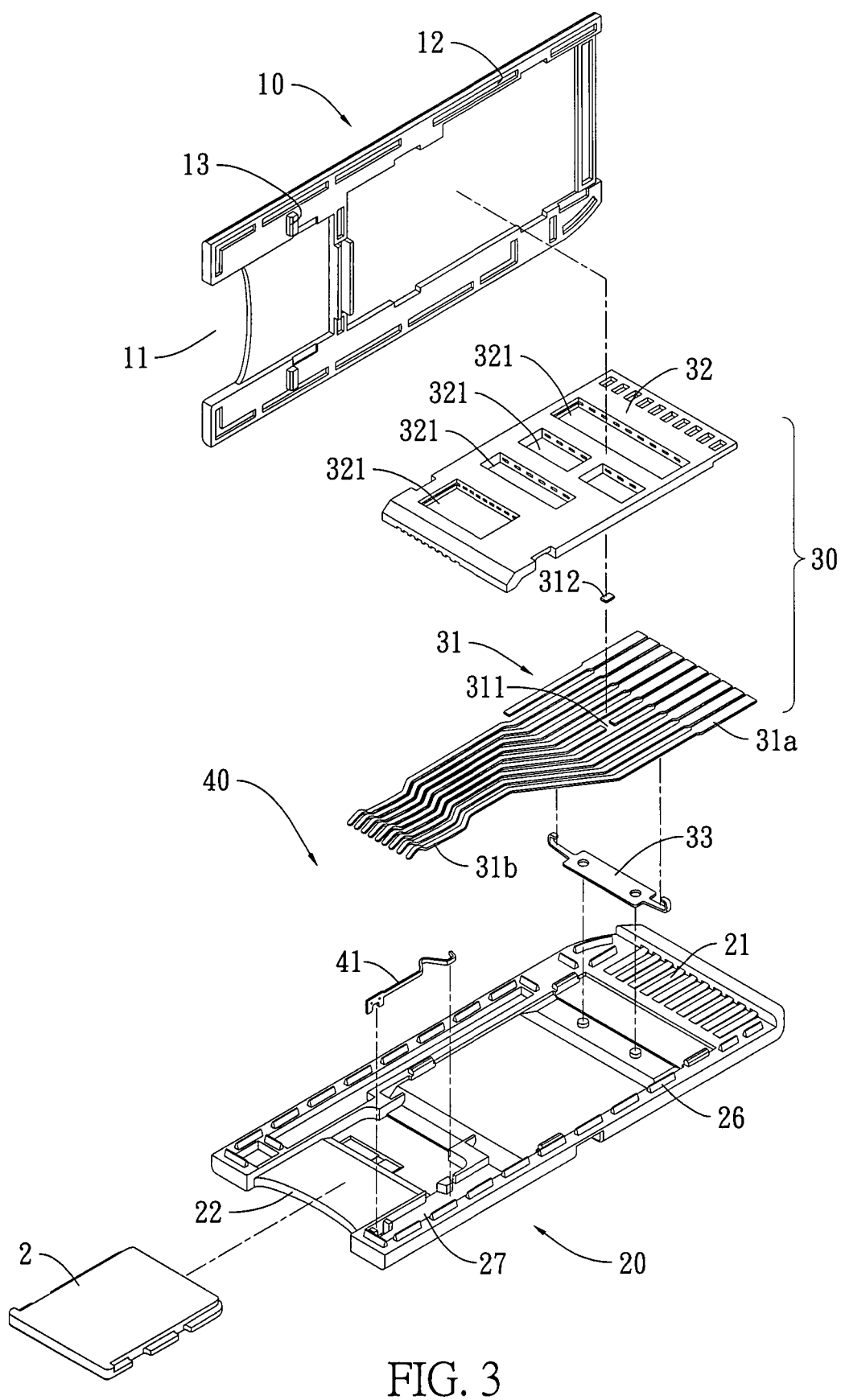
FIG. 3 shows an exploded elevational view of the embodiment depicting component members according to the present invention.
Figure 4:
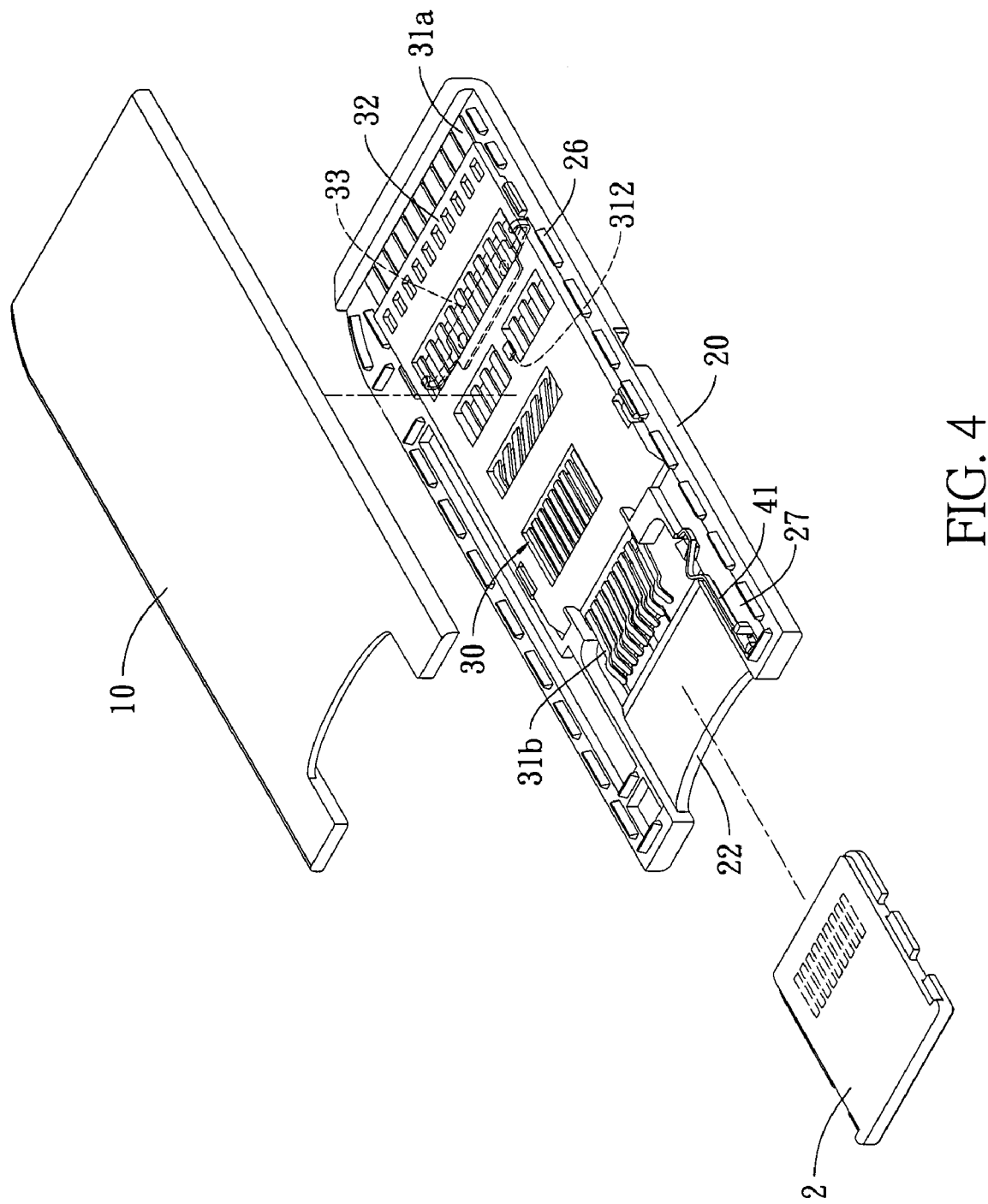
FIG. 4 shows a schematic view of the embodiment according to the present invention.
Figure 5:
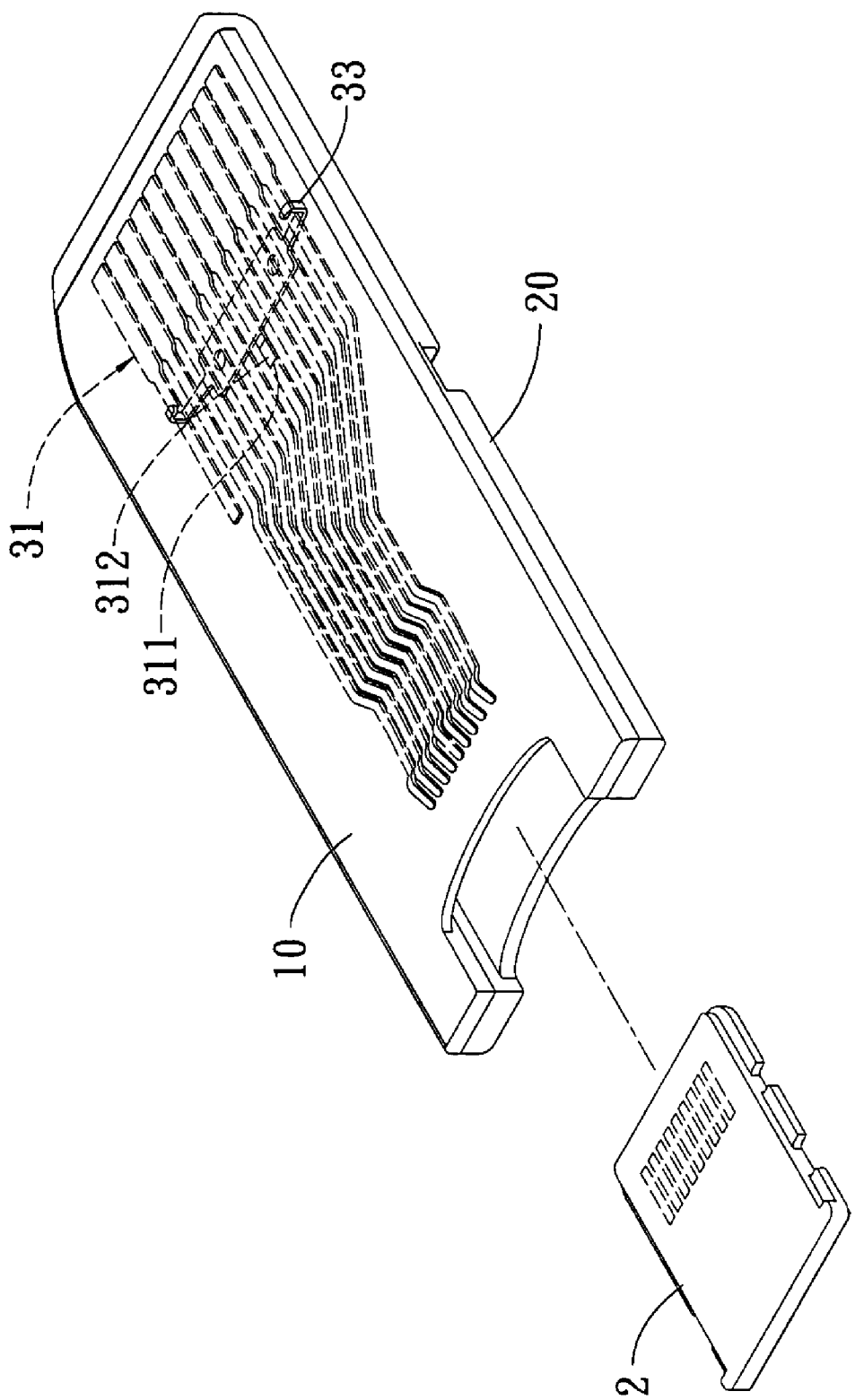
FIG. 5 shows a schematic view of the embodiment of the present invention being combined with a micro memory card (M2).
Figure 6:
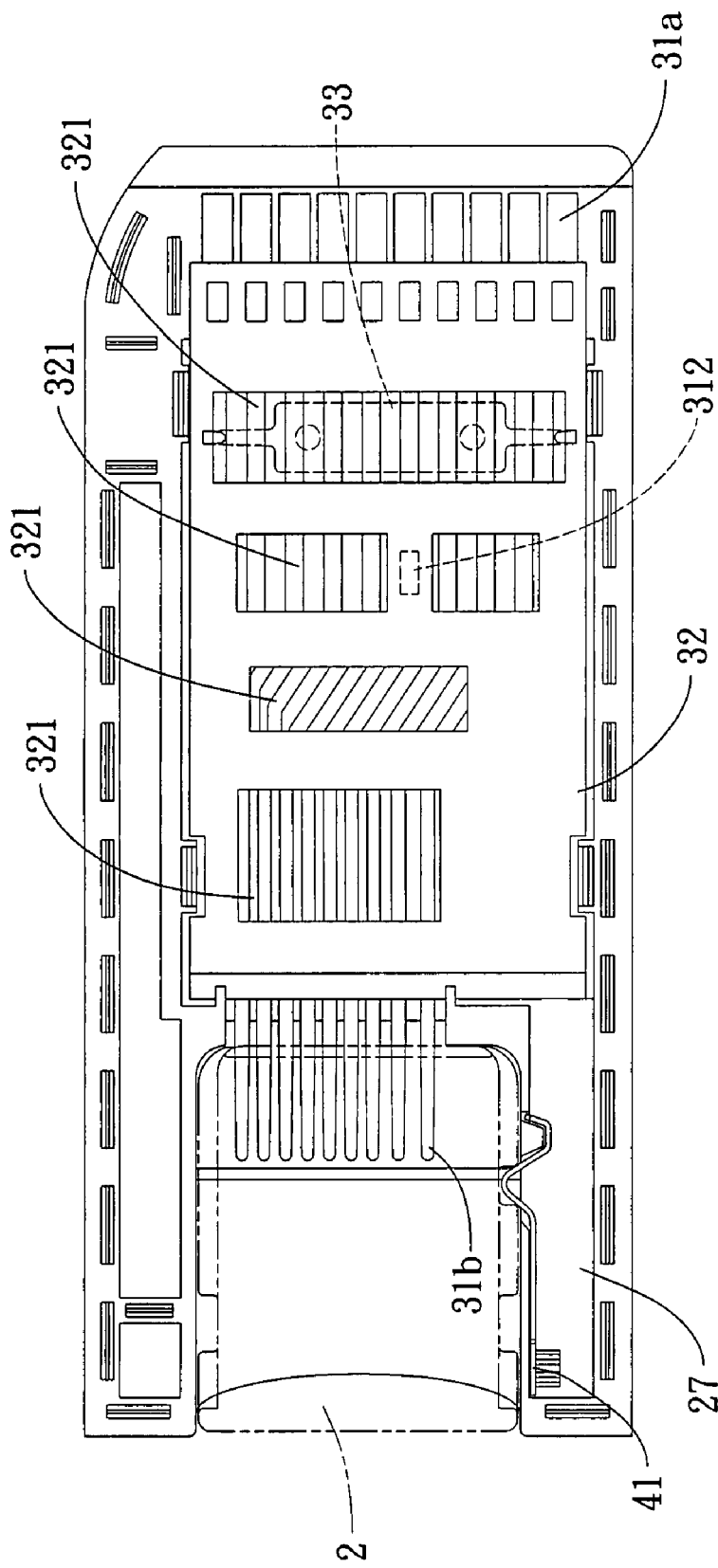
FIG. 6 shows a planar schematic view of the micro memory card (M2) connected to the embodiment of the present invention.

Referring to FIGS. 2~6, which show an improved card adapter structure of the present invention, comprising:

An upper cover 10 having a structure designed to conform to short memory card (MS) specifications, wherein an insertion slot 11 is defined at a rear portion of the upper cover 10 corresponding to the shape of a micro memory card (M2) 2, fixing portions 13 are located on two sides of the insertion slot 11 and a positioning structure 12 is configured on a bottom surface of the upper cover 10.

A lower cover 20 having a structure designed to conform to short memory card (MS) specifications, wherein a short memory card (MS) port 21 is configured at a front portion of the lower cover 20, and an opening 22 is defined in a rear portion of the lower cover 20 to accommodate a micro memory card (M2). Fixing portions 27 are located on two sides of the opening 22, and a positioning structure 26 is configured on an edge of the lower cover 20 corresponding to the positioning structure 12 of the upper cover 10.

A converter terminal set 30 configured with ten terminals 31, wherein an injection molded fixing mount 32 fixedly covers each of the terminals 31 of the converter terminal set 30, and ten contact pins 31a extend outward towards the short memory card (MS) port 21. No. one pin and No. ten pin of the ten contact pins 31a are configured with a large grounding area 33. An embodiment of the large grounding area 33 adopts a bendable large conducting strip (in actual use, method adopted can be a conventional layout of a printed circuit board, conducting coated material or conducting paint), and nine contact pins 31b extend outward towards the micro memory card (M2) opening 22. At least one terminal 31 of the No. four, six, seven and eight terminals of the converter terminal set 30 is configured with a gap 311 that is joined to an electric resistance 312. The electric resistance 312 joined to the gap 311 of the terminal 31 adopts a printing carbon resistor paste method to achieve electric resistance or a surface mount device (SMD) soldering method is employed for joining. Furthermore, a plurality of slots 321 are defined in the fixing mount 32, which, after injection molding, enable cutting out of connecting sections between each of the terminals 31 and dissipating of heat.

A positioning elastic strip set 40 having two kinked elastic strips 41 that correspondingly fit between the fixing portions 13, 27 of the upper cover 10 and the lower cover 20 respectively, thereby enabling a micro memory card 2 (M2) to be fixedly clasped when inserted.

According to the aforementioned structural configuration of the improved card adapter structure of the present invention, as depicted in FIGS. 2~6, the present invention is characterized in having a structural assembly comprising the upper cover 10, the lower cover 20, the converter terminal set 30 and the positioning elastic strip set 40, wherein, at least one terminal 31 of the No. four, six, seven and eight terminals (which are configured as DAT A3, DAT A2, DAT A0 and DAT A1 communication terminals respectively) of the converter terminal set 30 is configured with the gap 311, that is joined to the electric resistance 312, and functions to restrict current flow, thereby effectively preventing overcurrent and minimizing damage to the circuit and memory structure. Moreover, the plastic injection molded fixing mount 32 is used to fixedly cover each of the terminals 31 of the converter terminal set 30 to enable fixedly positioning each of the terminals 31. Furthermore, the ten contact pins 31a of the terminals 31 of the converter terminal set 30 extend outward towards the short memory card (MS) port 21, and the substantially large grounding area 33 configured at No. one pin and No. ten pin of the ten contact points 31a provides a substantially large and more stable grounding area between the two pins, which avoids the shortcomings of prior art whereby the conventional thin conductor easily breaks off or mistakenly touches other pins, resulting in damage to the circuit and memory structure. Moreover, the present invention is able to effectively prevent unexpected signal surges and protect data stored within the memory. In addition, the card adapter structure of the present invention is provided with reinforced grounding effectiveness that isolates noise interference, thereby stabilizing speed of data transmission, improving memory card data access and increasing frequency of use. Moreover, the relatively larger and more stable grounding area between the two pins facilitates design of the card adapter circuit and structure. Accordingly, the present invention provides a configuration having effectiveness of a simple and convenient structural assembly, enables fixedly positioning each of the terminals 31, restricts current flow, reinforces grounding, protects data stored within memory, isolates noise interference, improves memory card data access and increases frequency of use, which increase practicability, convenience and safety of the entire configuration.

According to the aforementioned detailed description, persons familiar with related art are able to easily understand that the present invention can clearly achieve the aforementioned objectives, and evidently complies with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A card adapter structure, comprising:
    an upper cover having a structure designed to conform to a short memory card (MS) specifications, wherein an insertion slot is defined at a rear of the upper cover corresponding to a shape of a micro memory card (M2), fixing portions are located on two sides of the insertion slot, and a positioning structure is configured on a bottom surface of the upper cover;
    a lower cover having a structure designed to conform to the short memory card (MS) specifications, wherein a short memory card (MS) port is configured at a front of the lower cover, and an opening is defined at a rear of the lower cover to accommodates the micro memory card (M2), fixing portions are located on two sides of the opening, and a positioning structure is configured on an edge of the lower cover corresponding to the positioning structure of the upper cover;
    a converter terminal set configured with ten terminals having ten contact pins located on a first end and nine contact pins located on a second end, wherein an injection molded fixing mount fixedly covers each of the terminals of the converter terminal set, and the ten contact pins extend outward towards the short memory card (MS) port, and the nine contact pins extend outward towards the micro memory card (M2) opening, at least one terminal of the converter terminal set is configured with a gap that is joined to an electric resistance; and
    a positioning elastic strip set correspondingly located between the fixing portions of the upper cover and the lower cover;
    whereby a micro memory card (M2) of relatively small size is able to be converted into a short memory card (MS) of relatively larger size to facilitate insertion into digital products having a short memory card (MS) circuit interface for further use thereof.

2. The card adapter structure according to claim 1, wherein a plurality of slots are defined in the fixing mount, which, after injection molding, enable cutting out of connecting sections between each of the terminals and dissipating of heat.

3. The card adapter structure according to claim 1, wherein the positioning elastic strip set is configured with two kinked elastic strips that correspondingly fit between the fixing portions of the upper cover and the lower cover, thereby enabling a micro memory card (M2) to be fixedly clasped when inserted.

4. The card adapter structure according to claim 1, wherein the electric resistance joined to the gap adopts a printing carbon resistor paste method to achieve electric resistance.

5. The card adapter structure according to claim 1, wherein the electric resistance joined to the gap adopts a surface mount device (SMD) soldering method for joining.

6. The card adapter structure according to claim 1, wherein No. one pin and No. ten pin of the ten contact pins are configured with a large grounding area.

7. The card adapter structure according to claim 6, wherein the converter terminal set adopts a bendable large conducting strip as the large grounding area.

8. The card adapter structure according to claim 6, wherein the converter terminal set adopts a layout of a printed circuit board as the large grounding area.

9. The card adapter structure according to claim 6, wherein the converter terminal set adopts a conducting coated material as the large grounding area.

10. The card adapter structure according to claim 6, wherein the converter terminal set adopts conducting paint as the large grounding area.

* * * * *